United States Patent
LeCrone et al.

(10) Patent No.: US 9,665,307 B1
(45) Date of Patent: May 30, 2017

(54) INCREMENTAL CONTINUOUS DATA PROTECTION

(71) Applicant: EMC Corporation, Hopkinton, MA (US)

(72) Inventors: Douglas E. LeCrone, Hopkinton, MA (US); Gary H. Cox, Forestdale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 14/133,929

(22) Filed: Dec. 19, 2013

(51) Int. Cl.
*G06F 3/06* (2006.01)

(52) U.S. Cl.
CPC ............ *G06F 3/065* (2013.01); *G06F 3/0614* (2013.01); *G06F 3/0683* (2013.01)

(58) Field of Classification Search
CPC ............ G06F 11/1456; G06F 11/2074; G06F 11/2071; G06F 3/067; G06F 3/065; G06F 3/0647
USPC .................................................. 711/161, 162
See application file for complete search history.

(56) References Cited

U.S. PATENT DOCUMENTS

| | | | | |
|---|---|---|---|---|
| 5,381,545 A * | 1/1995 | Baker | .................. | G06F 11/1451 707/999.202 |
| 6,023,710 A * | 2/2000 | Steiner | ............... | G06F 17/30067 |
| 6,125,371 A * | 9/2000 | Bohannon | ......... | G06F 17/30309 707/695 |
| 6,366,986 B1 * | 4/2002 | St. Pierre | ............ | G06F 11/1451 711/162 |
| 6,594,744 B1 * | 7/2003 | Humlicek | ............. | G06F 3/0601 707/999.202 |
| 6,965,976 B2 * | 11/2005 | Yamaguchi | ......... | G06F 11/1456 711/154 |
| 7,007,044 B1 * | 2/2006 | Rafert | .................. | G06F 11/2082 707/655 |
| 7,054,883 B2 * | 5/2006 | Meiri | ................ | G06F 17/30067 |
| 7,340,489 B2 * | 3/2008 | Vishlitzky | ............. | G06F 3/0601 |

(Continued)

OTHER PUBLICATIONS

EMC Corporation, "EMC RecoverPoint CDP: Continuous Data Protection for Operational Recovery, Applied Technology," White paper H6181.2, Feb. 2011, 22 pp.

(Continued)

*Primary Examiner* — Midys Rojas
*Assistant Examiner* — Khoa D Doan
(74) *Attorney, Agent, or Firm* — Muirhead and Saturnelli, LLC

(57) ABSTRACT

Systems and techniques are provided for incremental Continuous Data Protection (iCDP) as a process to secure frequent, and space efficient, versions of consistent point-in-time images of a group of volumes using snapshot technology. The system described herein provides for automation to create and manage frequent snapshots of defined groups of volumes. The incremental approach of the system described herein provides a convenient way to roll back to prior point-in-time versions to investigate data damage due to processing errors or other forms of corruption. The intervals between versions may be controlled. The system beneficially provides for identifying, monitoring, and reclaiming use of log space in log devices in connection with managing recovery and roll back capabilities of the system to desired data versions for purposes of data protection.

18 Claims, 12 Drawing Sheets

(56) References Cited

U.S. PATENT DOCUMENTS

| | | | |
|---|---|---|---|
| 7,383,465 B1* | 6/2008 | van Rietschote | G06F 11/1471 714/13 |
| 7,475,207 B2* | 1/2009 | Bromling | G06F 11/2064 709/214 |
| 7,519,870 B1* | 4/2009 | Sim-Tang | G06F 11/1471 714/48 |
| 7,558,926 B1* | 7/2009 | Oliveira | G06F 11/1471 711/161 |
| 7,685,385 B1* | 3/2010 | Choudhary | G06F 11/1471 711/162 |
| 7,716,435 B1* | 5/2010 | Allen | G06F 11/1469 711/154 |
| 7,774,565 B2* | 8/2010 | Lewin | G06F 17/30368 707/648 |
| 7,779,291 B2* | 8/2010 | Yoder | G06F 11/2058 711/162 |
| 7,831,560 B1* | 11/2010 | Spertus | G06F 17/30117 707/639 |
| 7,860,836 B1* | 12/2010 | Natanzon | G06F 11/1471 707/648 |
| 7,925,856 B1* | 4/2011 | Greene | G06F 17/30144 707/648 |
| 8,046,545 B2* | 10/2011 | Meiri | G06F 11/2064 711/162 |
| 8,060,713 B1* | 11/2011 | Natanzon | G06F 17/30368 711/162 |
| 8,145,838 B1* | 3/2012 | Miller | G06F 11/2023 711/114 |
| 8,151,069 B1* | 4/2012 | Blitzer | G06F 11/1461 711/112 |
| 8,171,246 B2* | 5/2012 | Balasubramanian | G06F 3/0608 711/162 |
| 8,250,033 B1* | 8/2012 | De Souter | G06F 17/30088 707/637 |
| 8,285,758 B1* | 10/2012 | Bono | G06F 17/30079 707/822 |
| 8,352,431 B1* | 1/2013 | Protopopov | G06F 17/30082 707/640 |
| 8,407,448 B1* | 3/2013 | Hayden | G06F 9/45533 711/162 |
| 8,515,911 B1* | 8/2013 | Zhou | G06F 17/3023 707/638 |
| 8,725,691 B1* | 5/2014 | Natanzon | G06F 11/2069 707/640 |
| 8,751,727 B2* | 6/2014 | Kawamura | G06F 3/0619 707/813 |
| 8,756,197 B1* | 6/2014 | Wilde | G06F 17/00 707/610 |
| 8,762,347 B1* | 6/2014 | Gokhale | G06F 17/30227 707/649 |
| 8,819,362 B1* | 8/2014 | Duprey | G06F 11/2069 711/161 |
| 8,990,520 B1* | 3/2015 | Tang | G06F 12/1072 711/154 |
| 2005/0235016 A1* | 10/2005 | Amano | G06F 11/1435 |
| 2005/0251540 A1* | 11/2005 | Sim-Tang | G06Q 10/06 |
| 2006/0155946 A1* | 7/2006 | Ji | G06F 3/0617 711/162 |
| 2007/0094467 A1* | 4/2007 | Yamasaki | G06F 11/2082 711/162 |
| 2007/0300008 A1* | 12/2007 | Rogers | G06F 12/0292 711/103 |
| 2008/0010422 A1* | 1/2008 | Suzuki | G06F 11/1471 711/162 |
| 2008/0027998 A1* | 1/2008 | Hara | G06F 17/30088 |
| 2008/0059732 A1* | 3/2008 | Okada | G06F 11/1471 711/162 |
| 2008/0071841 A1* | 3/2008 | Okada | G06F 11/1469 |
| 2008/0183990 A1* | 7/2008 | Chen | G06F 11/1435 711/162 |
| 2009/0024871 A1* | 1/2009 | Emaru | G06F 11/0727 714/6.12 |
| 2009/0094403 A1* | 4/2009 | Nakagawa | G06F 3/0605 711/6 |
| 2009/0125692 A1* | 5/2009 | Yamamoto | G06F 11/1451 711/162 |
| 2010/0023716 A1* | 1/2010 | Nemoto | G06F 11/1451 711/162 |
| 2010/0036851 A1* | 2/2010 | Paterson-Jones | G06F 17/30067 707/636 |
| 2011/0276573 A1* | 11/2011 | Wang | G06F 11/1453 707/740 |
| 2013/0282999 A1* | 10/2013 | Bennett | G06F 3/065 711/162 |

OTHER PUBLICATIONS

U.S. Appl. No. 12/215,984, filed Jun. 30, 2008, LeCrone et al.
U.S. Appl. No. 13/340,958, filed Dec. 11, 2011, Nickurak et al.

* cited by examiner

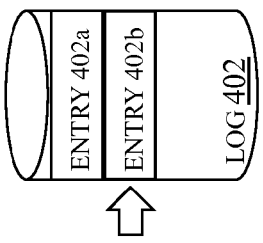

INCREMENTAL CONTINUOUS DATA PROTECTION

TECHNICAL FIELD

This application relates to computer storage devices, and more particularly to the field of maintaining copies of data for computer storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

Point-in-time image technologies are used in storage systems to record contents of storage objects at a given moment in time, and may be useful for many reasons, including data protection. An example of a logical point-in-time image version of a logical volume is a snapshot copy that may be obtained relatively quickly and without significant overhead by creating a data structure initially containing pointers that point to sections of the logical volume. As data is written to sections of the logical volume (e.g., tracks) two different versions of data are maintained. A first version of the data represents the original data that existed when the snapshot was initiated and a second version of the data represents the new data being written. There are many different specific mechanisms for providing snapshot copies, and reference is made, for example, to U.S. Pat. No. 8,515,911 to Zhou et al., entitled "Methods and Apparatus for Managing Multiple Point In Time Copies in a File System," U.S. Pat. No. 8,352,431 to Protopopov et al., entitled "Fine-Grain Policy-Based Snapshots," U.S. Pat. No. 8,151,069 to Blitzer et al., entitled "Multiprotection for Snapshots," U.S. Pat. No. 7,716,435 to Allen, entitled "Protection of Point-In-Time Application Data Using Snapshot Copies of a Logical Volume," and U.S. Pat. No. 7,340,489 to Vishlitzky et al., entitled "Virtual Storage Devices," which are all incorporated herein by reference. Unless otherwise specified, the term "snapshot" as used herein should be understand to refer generally to any appropriate point-in-time image technique.

Snapshots may be useful for recovering from logical errors. For example, if a logical device contains data for a database for which a snapshot is made at 10:00 a.m., and a user inadvertently erases important data at 11:00 a.m. (or a program error causes corruption of the data for the database), then it is possible to recover the 10:00 a.m. version of the data using the snapshot. Note also that, since a snapshot may be initiated by creating a table of pointers to actual data, then there may be relatively little overhead/time associated with creating a snapshot.

Differential data protection (or backup) systems using snapshots are known in which only some segments of data in a primary copy are backed up. A complete copy of a backed up element may be made from an earlier backup and a subsequent differential backup. A differential snapshot does not replicate a full copy of the data set (referred to as a production data set). Rather, the snapshot only stores differences between a current version of the production data set and the version of the data set at the point in time when the snapshot was taken. For further discussions of differential data protection systems, reference is made, for example, to U.S. Pat. No. 8,250,033 to De Souter et al., entitled "Replication of a Data Set Using Differential Snapshots," and U.S. Pat. No. 6,366,986 to St. Pierre et al., entitled "Method and Apparatus for Differential Backup in a Computer Storage System," which are incorporated herein by reference. For example, EMC Corporation's Symmetrix products may include a mechanism called Symmetrix Differential Data Facility (SDDF) that is a mechanism used to differentially track changes to volumes in remote Symmetrix arrays. SDDF allows differential resynchronization between the remote Symmetrix arrays in the event of a loss of the primary site array.

Continuous snapshotting (CS) refers to a process of taking snapshots of any content change in a storage system. In connection with the content being user data, the process may be referred to as continuous data protection (CDP). In a CS/CDP implementation, individual writes to storage are duplicated and stored in a log of activity in one or more journal devices. By replaying these writes in reverse, storage may be "rolled back" (a roll-back) or reverted to any past state which was covered by the logs. This may be done on production storage, or in a duplicate copy of the storage to avoid disruption to users of the production storage. In the latter case, when access to historic data is no longer required, the log may be replayed again in forward order (a roll-forward) to restore the duplicate to the production state and possibly including logged writes that occurred since roll-back. An example of a product that provides continuous data protection with multiple recovery points to restore applications instantly to a specific point in time is RecoverPoint by EMC Corporation.

For further discussion of techniques for providing continuous data protection, reference is made, for example, to U.S. Pat. No. 8,046,545 to Meiri et al., entitled "Continuous Backup," which discloses a system for providing continuous backup of a storage device and restoring the storage device to prior states; U.S. Pat. No. 7,558,926 to Oliveira et al., entitled "Continuous Data Backup Using Distributed Journaling," which discloses techniques for providing continuous data backups of primary storage using distributed journals. The above-noted references are incorporated herein by reference.

Accordingly, it would be desirable to provide data protection techniques and systems that efficiently facilitate the creating, managing, operating and monitoring of data backup and recovery elements for continuous data protection.

SUMMARY OF THE INVENTION

According to the system described herein, a method for providing data protection in a storage system includes storing a plurality of point-in-time versions of data of a source volume in the storage system. An interval is controlled between times when each of the plurality of point-in-time versions is stored. In connection with a write to the data stored in the source volume, at least one log entry is stored in a log device corresponding to a particular point-in-time version of the data prior to the write. Subsequent point-in-time versions after the particular point-in-time version may share the log entry until a subsequent write to the data stored in the source volume is performed. The point-in-time versions and the at least one log entry enable the storage system to revert from a current data state to a one or more point-in-time states defined by the point-in-time versions. Termination of at least one point-in-time version is controlled according to at least one criterion. The at least one criterion may include criteria concerning reclamation of log space on the log device, and controlling the termination of the at least one point-in-time version may include analyzing how the termination affects log capacity of the log device. The at least one criterion may include criteria concerning identifying point-in-time versions for termination that still enables reversion to any desired prior storage state, and controlling the termination of the at least one point-in-time version may include optimizing the identification of the point-in-time versions to enable reversion to any desired prior storage state in a way that minimizes use of log space on the log device. An interface device may be provided that receives a query concerning the at least one criterion and outputs results of the termination of the at least one point-in-time version. The method may further include analyzing results of controlling the termination of at least one point-in-time version according to at least one criterion, and controlling the interval between times when each of the plurality of point-in-time versions is stored according to the results.

According to the system described herein, a non-transitory computer readable medium stores software for providing data protection in a storage system. The software includes executable code that stores a plurality of point-in-time versions of data of a source volume in the storage system. An interval is controlled between times when each of the plurality of point-in-time versions is stored. In connection with a write to the data stored in the source volume, executable code is provided that stores at least one log entry in a log device corresponding to a particular point-in-time version of the data prior to the write. Subsequent point-in-time versions after the particular point-in-time version may share the log entry until a subsequent write to the data stored in the source volume is performed. The point-in-time versions and the at least one log entry enable the storage system to revert from a current data state to a one or more point-in-time states defined by the point-in-time versions. Executable code is provided that controls termination of at least one point-in-time version according to at least one criterion. The at least one criterion may include criteria concerning reclamation of log space on the log device, and controlling the termination of the at least one point-in-time version may include analyzing how the termination affects log capacity of the log device. The at least one criterion may include criteria concerning identifying point-in-time versions for termination that still enables reversion to any desired prior storage state, and controlling the termination of the at least one point-in-time version may include optimizing the identification of the point-in-time versions to enable reversion to any desired prior storage state in a way that minimizes use of log space on the log device. Executable code may be provided for an interface that receives a query concerning the at least one criterion and outputs results of the termination of the at least one point-in-time version. Executable code may be provided that analyzes results of controlling the termination of at least one point-in-time version according to at least one criterion, and controlling the interval between times when each of the plurality of point-in-time versions is stored according to the results.

According further to the system described herein, a data protection system includes at least one storage device that stores a source volume of data, and at least one log device that stores log entries corresponding to the data stored on the source volume. A non-transitory computer readable medium stores software that, when executed by at least one processor, provides data protection. The software includes executable code that stores a plurality of point-in-time versions of data from the source volume in the storage system. An interval is controlled between times when each of the plurality of point-in-time versions is stored. In connection with a write to the data stored in the source volume, executable code is provided that stores at least one log entry in the log device corresponding to a particular point-in-time version of the data prior to the write. Subsequent point-in-time versions after the particular point-in-time version may share the log entry until a subsequent write to the data stored in the source volume is performed. The point-in-time versions and the at least one log entry enable the storage system to revert from a current data state to a one or more point-in-time states defined by the point-in-time versions. Executable code is provided that controls termination of at least one point-in-time version according to at least one criterion. The at least one criterion may include criteria concerning reclamation of log space on the log device, and controlling the termination of the at least one point-in-time version may include analyzing how the termination affects log capacity of the log device. The at least one criterion may include criteria concerning identifying point-in-time versions for termination that still enables reversion to any desired prior storage state, and controlling the termination of the at least one point-in-time version may include optimizing the identification of the point-in-time versions to enable reversion to any desired prior storage state in a way that minimizes use of log space on the log device. Executable code may be provided for an interface that receives a query concerning the at least one criterion and outputs results of the termination of the at least one point-in-time version. Executable code may be provided that analyzes results of controlling the termination of at least one point-in-time version according to at least one criterion, and controlling the interval between times when each of the plurality of point-in-time versions is stored according to the results.

BRIEF DESCRIPTION OF THE DRAWINGS

Embodiments of the system described herein are explained with reference to the several figures of the drawings, which are briefly described as follows.

FIGS. 15 and 16 show scenario representations according to an embodiment of the system described herein for reclamation of a subject device when multiple tracks are involved to reclaim log capacity.

FIG. 17 is a schematic representation according to the embodiment of the system described herein shown in FIG. 15 in which versions have been terminated, but all unique first write pre-write images in each version interval are preserved.

DETAILED DESCRIPTION OF VARIOUS EMBODIMENTS

Figure 1:
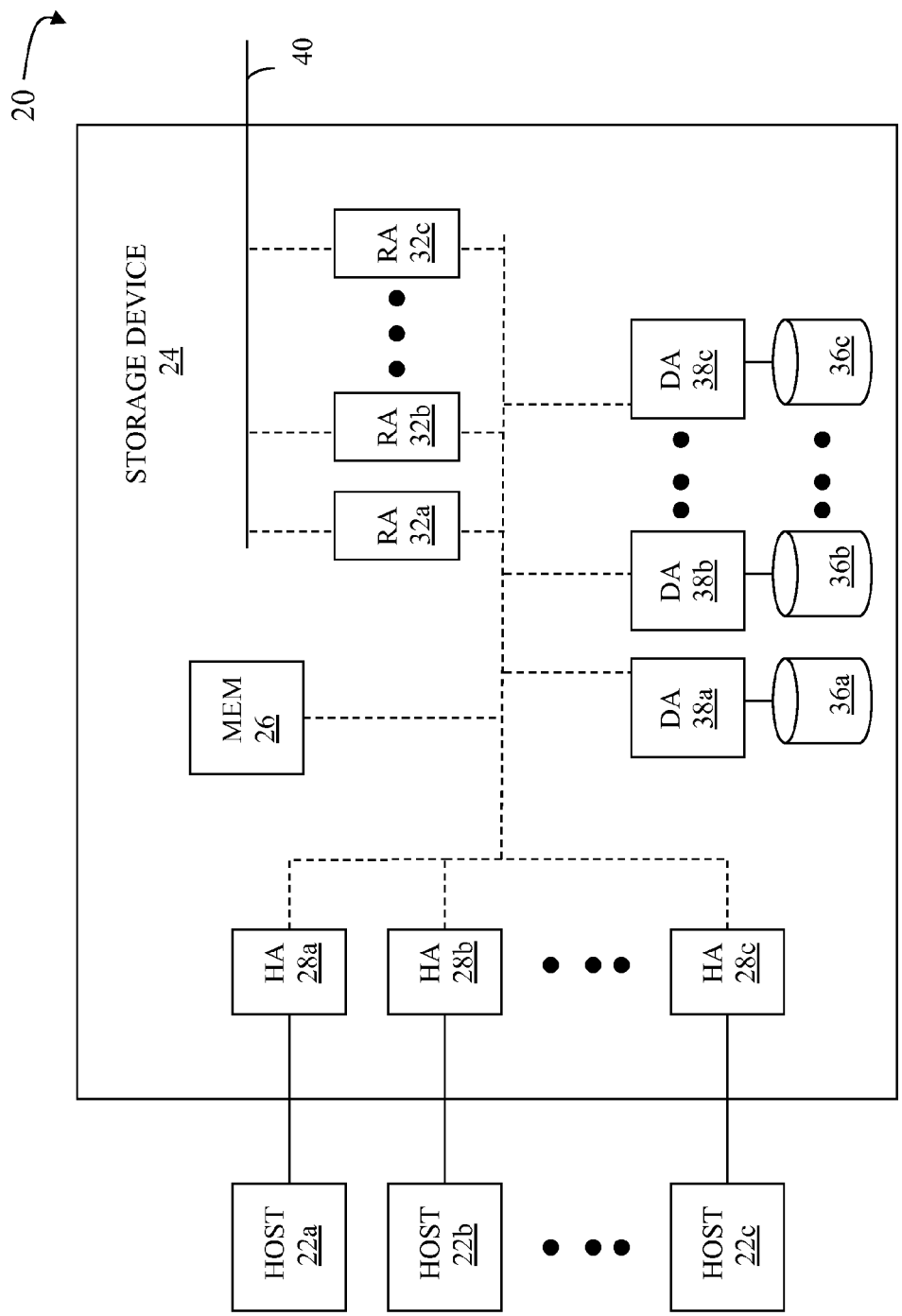
FIG. 1 is a schematic diagram showing a plurality of hosts coupled to a data storage device that may be used in connection with an embodiment of the system described herein.

FIG. 1 is a schematic diagram 20 showing a plurality of hosts 22a-22c coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. In various embodiments, the storage device 24 may be a Symmetrix storage device, a CLARiiON storage device and/or a VPLEX product produced by EMC Corporation of Hopkinton, Mass., although the system described herein may also operate in connection with any other suitable storage device and products.

In an embodiment, the storage device 24 may include one or more Remote Data Facility (RDF) adapter units (RA's) 32a-32c. An RDF product produced by EMC Corporation, may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but are used to transfer data between the storage device 24 and other storage devices that are also coupled to the RDF link 40. The storage device 24 may be coupled to additional RDF links (not shown) in addition to the RDF link 40. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical storage space may also be merged in connection with use of a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage device 24 may be provided as a stand-alone device coupled to the hosts 22a-22c as shown in FIG. 1 or, alternatively, the storage device 24 may be part of, and/or otherwise coupled to, a storage area network (SAN) that may include a plurality of other storage devices as well as switches, routers, network connections, etc., as further discussed elsewhere herein.

Figure 2:
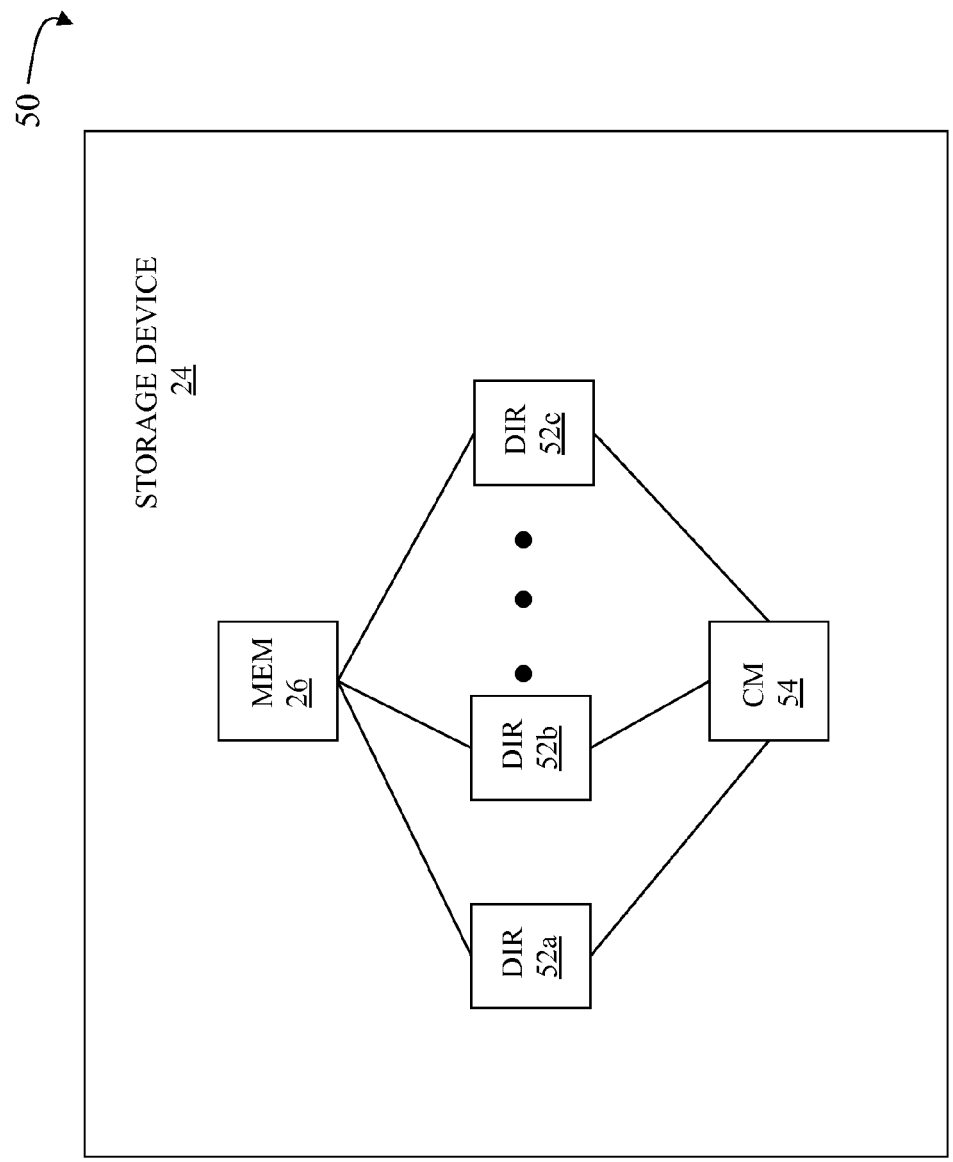
FIG. 2 is a schematic diagram illustrating an embodiment of the storage device where each of a plurality of directors are coupled to the memory.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
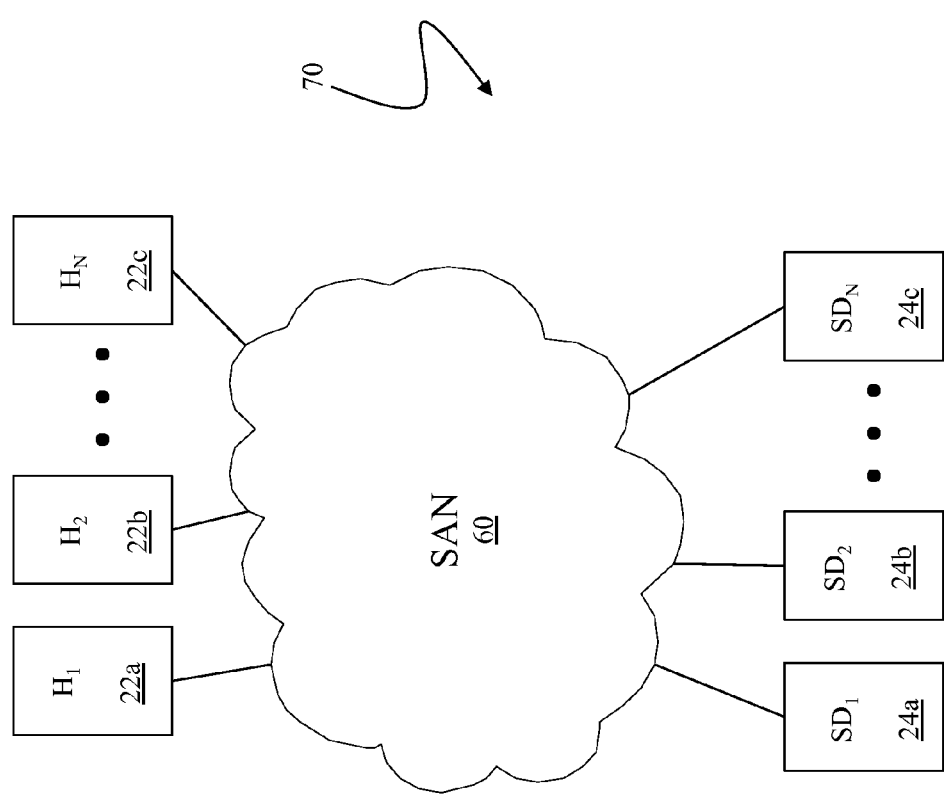
FIG. 3 is a schematic illustration showing a storage area network (SAN) providing a SAN fabric coupling a plurality of host devices to a plurality of storage devices that may be used in connection with an embodiment of the system described herein.

FIG. 3 is a schematic illustration 70 showing a storage area network (SAN) 60 providing a SAN fabric coupling a plurality of host devices ($H_1$-$H_N$) 22a-c to a plurality of storage devices ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

Figure 4:
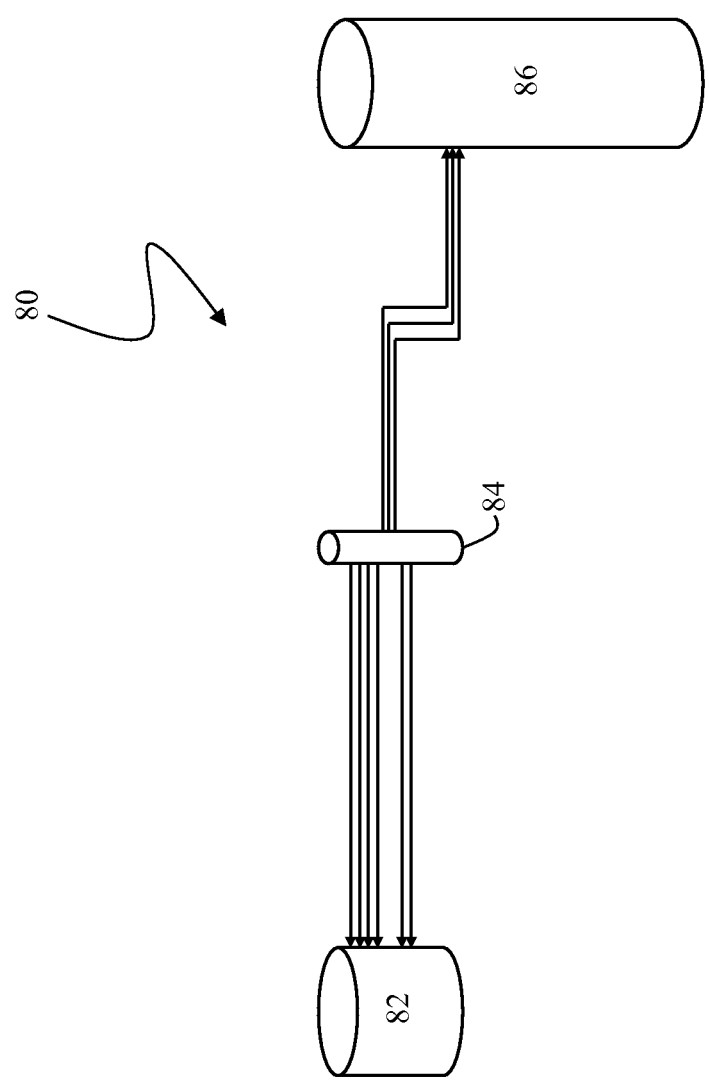
FIG. 4 is a schematic diagram showing a standard logical device, a point-in-time image device, and a journal (or log) device that may be used in connection with an embodiment of the system described herein

FIG. 4 is a schematic diagram 80 showing a standard logical device 82, a point-in-time image device 84, such as a snapshot image device and/or other appropriate point-in-time image device, and a journal (or log) device 86 that may be used in connection with an embodiment of the system described herein. The standard logical device 82 may be implemented using any appropriate storage logical device mechanism, such as logical storage devices used on a Symmetrix and/or VPLEX product provided by EMC Corporation, and used to access corresponding physical storage disks, like disks 36a-c (see FIG. 1). Similarly, the point-in-time image device 84 may be any logical or virtual device that can provide point-in-time image (or version) functionality for the logical device 82. As discussed herein, the point-in-time image device 84 may represent a point-in-time image of all or a portion of the standard logical device 82. A host coupled to a storage device that accesses the point-in-time image device 84 may access the point-in-time image device 84 in the same way that the host would access the standard logical device 82. However, the point-in-time image device 84 does not contain any track data from the standard logical device 82. Instead, the point-in-time image device 84 includes a plurality of table entries that point to tracks on either the standard logical device 82 or the journal device 86.

When the point-in-time image device 84 is established (e.g., when a point-in-time image is made of the standard logical device 82), the point-in-time image device 84 is created and provided with appropriate table entries that, at the time of establishment, point to tracks of the standard logical device 82. A host accessing the point-in-time image device 84 to read a track would read the appropriate track from the standard logical device 82 based on the table entry of the point-in-time image device 84 pointing to the track of the standard logical device 82.

After the point-in-time image device 84 has been established, it is possible for a host to write data to the standard logical device 82. In that case, the previous data that was stored on the standard logical device 82 may be copied to the journal device 86 and the table entries of the point-in-time image device 84 that previously pointed to tracks of the standard logical device 82 would be modified to point to the new tracks of the journal device 86 to which the data had been copied. Thus, a host accessing the point-in-time image device 84 may read either tracks from the standard logical device 82 that have not changed since the point-in-time image device 84 was established or, alternatively, may read corresponding tracks from the journal device 86 that contain data copied from the standard logical device 82 after the point-in-time image device 84 was established. Adjusting data and pointers in connection with reads and writes to and from the standard logical device 82 and journal device 84 is discussed in more detail elsewhere herein.

In an embodiment described herein, hosts may not have direct access to the journal device 86. That is, the journal device 86 would be used exclusively in connection with the point-in-time image device 84 (and possibly other point-in-time image devices as described in more detail elsewhere herein). In addition, for an embodiment described herein, the standard logical device 82, the point-in-time image device 84, and the journal device 86 may be provided on the single storage device 24. However, it is also possible to have portions of one or more of the standard logical device 82, the point-in-time image device 84, and/or the journal device 86 provided on separate storage devices that are appropriately interconnected.

It is noted that the system described herein may be used with data structures and copy mechanisms other than tables and/or pointers to tracks discussed, for example, in connection with snapshots and/or other point-in-time images. For example, the system described herein may also operate in connection with use of clones and/or deep copy backups automatically synchronized between data and metadata. Accordingly, the system described herein may be applied to any appropriate point-in-time image processing systems and techniques, and it should be understood that the discussions herein with respect to the creation and use of "snapshots," and the devices thereof, may be equally applied to the use of any appropriate point-in-time image used for point-in-time image processes in connection with protection of data and configuration metadata that enable the rolling back/forward of a storage system using the point-in-time images of the data and configuration metadata according to the system described herein.

Figure 5:
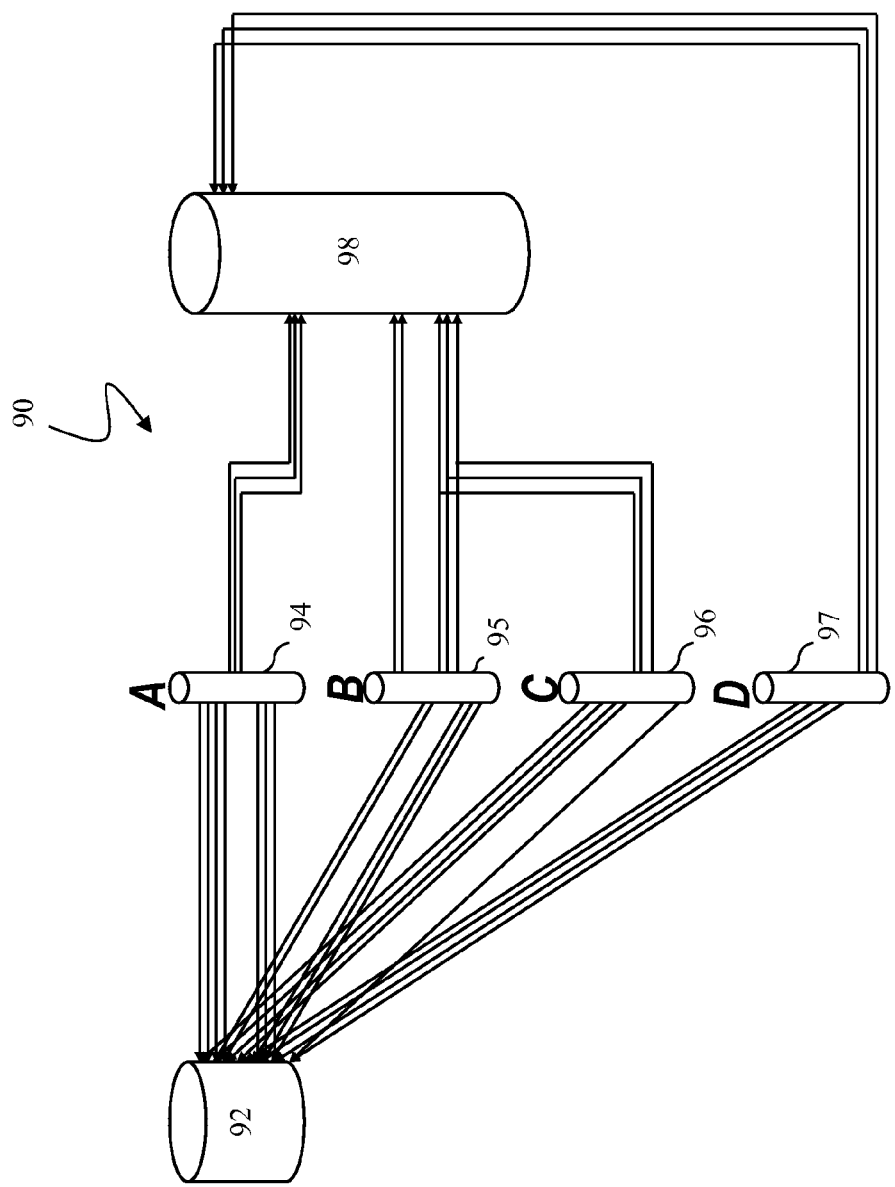
FIG. 5 is a schematic diagram showing another example of the use of virtual devices including a standard logical device, a plurality of point-in-time image devices and a journal device that may be used in connection with an embodiment of the system described herein.

FIG. 5 is a schematic diagram 90 showing another example of the use of virtual devices including a standard logical device 92, a plurality of point-in-time images 94-97 that may be generated by one or more point-in-time devices and a journal device 98 that may be used in connection with an embodiment of the system described herein. In the illustrated example, a point-in-time image 94 represents a point-in-time version of the standard logical device 92 taken at time A. Similarly, a point-in-time image of point-in-time image 95 represents a point-in-time version of the standard logical device 92 taken at time B, a point-in-time image 96 represents a point-in-time version of the standard logical device 92 taken at time C, and a point-in-time image 97 represents a point-in-time version of the standard logical device 92 taken at time D. Note that all of the point-in-time image 94-97 may share use of the journal device 98. In addition, it is possible for table entries of more than one of the point-in-time images 94-97, or, a subset of the table entries of the point-in-time image 94-97, to point to the same tracks of the journal device 98. For example, the point-in-time image 95 and the point-in-time image 96 are shown in connection with table entries that point to the same tracks of the journal device 98.

In an embodiment discussed herein, the journal device 98, and/or other journal devices discussed herein, may be provided by a pool of journal devices that are managed by the storage device 24 and/or other controller coupled to the SAN. In that case, as a point-in-time image device requires additional tracks of a journal device, the point-in-time image device would cause more journal device storage to be created (in the form of more tracks for an existing journal device or a new journal device) using the journal device pool mechanism. Pooling storage device resources in this manner is known in the art. Other techniques that do not use pooling may be used to provide journal device storage.

Figure 6:
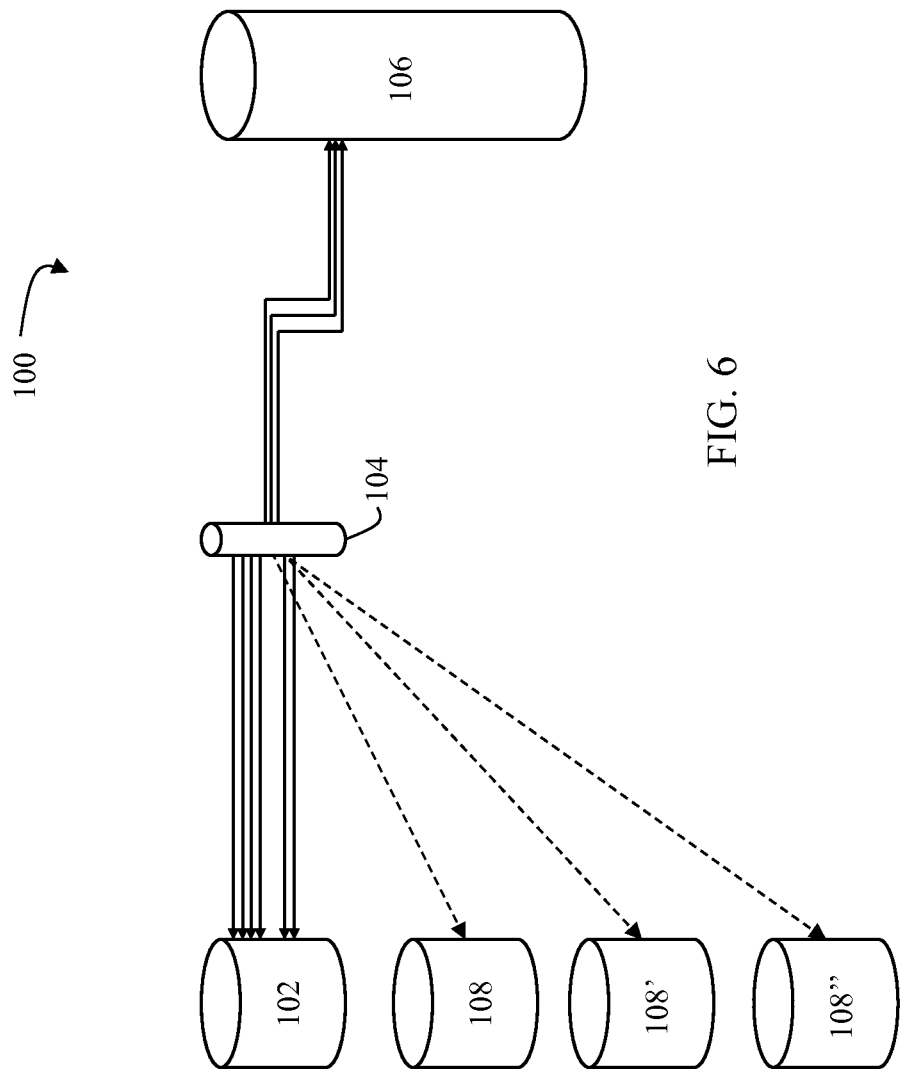
FIG. 6 is a schematic diagram that illustrates a system including a logical device, a point-in-time image device, a journal device, and a full copy device that may be used in connection with an embodiment of the system described herein.

FIG. 6 is a schematic diagram 100 that illustrates a system including a logical device 102, a point-in-time image device 104, a journal device 106, and a full copy device 108 that may be used in connection with an embodiment of the system described herein. As noted elsewhere herein, the logical device 102 may be implemented using any appropriate storage logical device mechanism. Similarly, the point-in-time image device 104 may be any logical point-in-time image device that can provide snapshot functionality, and/or other appropriate point-in-time image functionality, for the logical device 102. The journal device 106 provides storage for sections of data (e.g., tracks) of the logical device 102 that are overwritten after the point-in-time image device 104 has been initiated. The journal device 106 may be provided on the same physical device as the logical device 102 or may be provided on a different physical device.

In an embodiment, the system described herein may also be used in connection with full copies of data generated and stored according operation of the full copy device 108. The full copy device 108 may be a logical storage device like the logical device 102. As discussed in more detail elsewhere herein, the full copy device 108 may be configured to contain data copied from the logical device 102 and corresponding to one or more point-in-time images. As described below, the point-in-time image device 104 may create a point-in-time image and then, subsequently, data from the logical device 102, and possibly the journal device 106, may be copied and/or refreshed to the full copy device 108 in a background process that does not interfere with access to the logical device 102. Once the copy is complete, then the point-in-time image is protected from physical corruption of the data of the logical device 102, as discussed in more detail elsewhere herein. Note that, as shown in the figure, it is possible to have multiple copy devices 108', 108" etc. so that all of the copy devices 108, 108', 108" protect the point-in-time image from physical corruption. Accordingly, for the discussion herein, it should be understood that references to the copy device 108 may include, where appropriate, references to multiple copy devices. Note that, for some embodiments, the copy devices 108, 108', 108" may be copies provided at different times. Similarly, the system described herein may be applicable to multiple point-in-time copies provided at the same time or different times, like that shown in FIG. 5.

It is noted that the system described herein may be used in connection with use of consistency groups and with features for maintaining proper ordering of writes between storage devices. A consistency group represents a grouping of storage volumes (virtual or not) which together offer an application consistent image of the data. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference.

In an embodiment of the system described herein, it is further noted that content protected by point-in-time images, such as snapshots, e.g. in connection with CS/CDP, may be extended to include not only user data but further include configuration metadata, and/or other appropriate configuration information, of the storage management system. Configuration metadata of the storage management system may be information used for configuration volumes, storage devices, consistency groups and/or other appropriate storage management system elements, as further discussed elsewhere herein. A user may want to rollback a storage management system to a past point due to performance or stability issues attributed to configuration changes. The system described herein enables rollback to prior states based on storage configuration metadata in addition to rollback of user data and provides for synchronization of the data and configuration metadata in connection with a rollback, as further discussed elsewhere herein. For further discussion of systems using point-in-time image technologies involving both user data and configuration metadata, reference is made to U.S. patent application Ser. No. 13/340,958 to Nickurak et al., filed Dec. 30, 2011, entitled, "Continuous Protection of Data and Storage Management Configuration," which is incorporated herein by reference.

Figure 7:
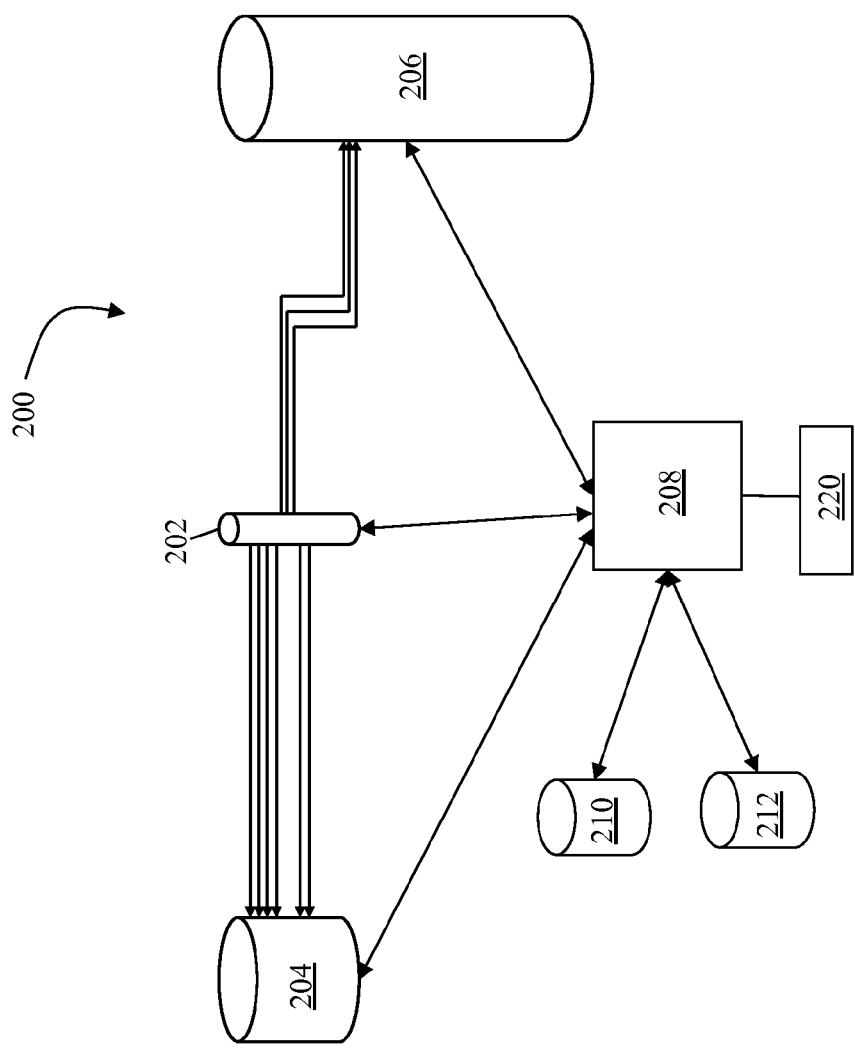
FIG. 7 is a schematic diagram that illustrates a continuous protection device that facilitates continuous or near continuous backup of data and storage configuration metadata using snapshots, other appropriate point-in-time images, according to an embodiment of the system described herein.

FIG. 7 is a schematic diagram 200 that illustrates a continuous protection device 202 that facilitates continuous or near continuous backup of data using snapshots, and/or other appropriate point-in-time images, and that may be used according to an embodiment of the system described herein. The continuous protection device 202 may contain pointers to a standard logical device 204 for a plurality of tracks such that, for any particular track, if the continuous protection device 202 points to a corresponding track of the standard logical device 204, then the corresponding track has not changed since creation of the continuous protection device 202. Note that any subsections, besides track, may be used to implement the system described herein. Accordingly, it should be understood in connection with the discussion that follows that although tracks are mentioned, other units of data having another size, including variable sizes, may be used. The continuous protection device 202 also contains pointers to a journal device 206 for a plurality of corresponding tracks. The journal device 206 contains data for tracks that have changed since creation of the continuous protection device 202.

The diagram 200 also shows an I/O module 208 that handles input and output processing to and from other modules, such as input and output requests made by the DA's 38a-38c and HA's 28a-28c. The I/O module 208 may be provided with information from a cycle counter 210 and/or a timer 212, among other possible information sources, that may be used to synchronize storage for a plurality of storage devices (i.e., a consistency group). The I/O module 208 may further include, and/or be coupled to, a user interface 220 that enables a user to tag data streams, among other functions as further discussed elsewhere herein. The user interface may be implemented using appropriate software and processors and may include a display and/or otherwise include operation using a display.

The system described herein allows for the ability to roll back/forward on multiple levels, including: per-volume basis, for configuration metadata and/or data; per-consistency group basis, for configuration metadata and/or data; per-system basis (all consistency groups, and system-wide configuration), for configuration metadata and/or data; and/or per-multi-system basis with the ability to control multiple systems with one user interface, for rolling management configuration and/or data. Other features and advantages of the system described herein include: elimination of manual storage configuration backups, which means reducing error-prone/inconvenient steps; elimination of manual storage configuration restores, which provides for reducing another set of error-prone/inconvenient steps; automatic write order fidelity across rollback in the presence of configuration changes; ability to control the roll back/forward points for management configuration/data independently. This allows choosing whether to roll management configuration back/forward only in those circumstances that warrant it; and/or ability to control the roll back/forward for configuration/data stream on a per volume and/or consistency-group and/or system-wide basis.

The system described herein allows for choosing the granularity of the roll back/forward of some of the system's volumes/consistency groups without requiring the whole system to roll back. Furthermore, the multi-system control aspect of the system described herein allows for restoring an organization's whole infrastructure (management configuration and data, independently) to a point in the past (or future) with the convenience of a single user interface.

According to the system described herein, techniques are provided for incremental Continuous Data Protection (iCDP) as a process to secure frequent, and space efficient, versions of consistent point-in-time images of a group of volumes using snapshot technology. In an embodiment, the group of volumes may be defined and organized as Version Data Group (VDGs). This system described herein may include tools and procedures to plan and operate a VDG and to use the member versions of the VDG to create and terminate target volume sets, particularly in connection with managing and/or optimizing use of log space on a journal or log device, as further discussed in detail elsewhere herein.

The system described herein provides for automation to create and manage frequent snapshots of defined groups of volumes. The incremental approach of the system described herein provides a convenient way to roll back to prior point-in-time versions to investigate data damage due to processing errors or other forms of corruption. The intervals between versions may be controlled. With sufficient resources the version increments may be controlled to be small, such as in minutes or smaller. The system beneficially provides for identifying, monitoring, and reclaiming use of log space in log devices in connection with managing recovery and roll back capabilities of the system to desired data versions for purposes of data protection. The system described herein may be implemented using any appropriate computing architecture and operating system, including, for example, using components of IBM Corporation's System z environment including use of z/OS and z/Architecture computing systems. For further discussion of the use of z/OS and z/Architecture components in simulated I/O environments, including techniques for the emulation of z/OS and z/Architecture components, reference is made to U.S. patent application Ser. No. 12/215,984 to LeCrone et al, filed Jun. 30, 2008, entitled "I/O Fault Injection Using Simulated Computing Environments," which is incorporated herein by reference.

The system described herein further provides for that by using target volume sets created from VDG version, repair strategies may be developed and tested without requiring the isolation of production systems or recreations to diagnose problems. Repairs may be possible on the source systems or the creation of a repaired replacement. Diagnostic target sets may not necessarily require full source image capacity. Techniques for iCDP implementation may include determining the storage capacity required for the associate snapshot log pool. Advantageously, the log capacity required according to the system described herein may be significantly less than the total duplication of source volumes capacity.

A point-in-time image (or snapshot) system architecture according to an embodiment of the system described herein may be storage efficient in that only first write track pre-write images are logged. The total number of unique tracks written while a snapshot version is active determines the log pool capacity consumed. If multiple versions are created the persistence of the track pre-write image in the pool is dependent on the number of previously activated versions that share that log entry. Reduction of log capacity consumption requires that a track pre-write image is no longer shared by versions. This is achieved by the termination of all snapshot versions sharing that image.

Multiple snapshot versions of a VDG set of volumes are created at regular intervals. Differential data tracking information, such as SDDF tracking information, may be used to analyze the write frequency and density of the source members of a VDG over a representative period of versioning intervals. Based on the analysis, the versioning intervals may be controlled to optimize the storage of the versions and the use of log capacity.

Pre-write images for tracks are created in the log pool or device when the first new write to a track occurs after a new snapshot version is activated. All subsequent writes to that track until the next interval are not logged since they are not needed to recreate a target image of the snapshot version. All prior versions containing the first write track share the same logged pre-write image. According to the system described herein, using the current source volumes and logged track pre-write images a selected version can be recreated on a target volume set.

SDDF provides a local function that marks modified (written) tracks and does not require any remote partner device. The differential update for local and remote devices uses the local and remote SDDF data to determine which tracks need to move to synchronize the pair. According to the system described herein, a first write analysis, as described elsewhere herein, may use local SDDF information that marks which tracks have been modified in a given interval. At the end of a current interval the SDDF information may be collected for future analysis and then cleared from the devices of interest. The SDDF mark, collect, and clear processes may repeat for each subsequent interval. The resulting collection of interval SDDF information provides maps of first writes that may be analyzed. VDG interval addition or reduction in log track space consumption may be determined. The collected SDDF maps may also contain information about persistence of shared first write tracks between VDG intervals.

For small interval SDDF first write maps collected, various VDG characteristics may be analyzed. For example, if the collected map intervals are 2 minutes VDG intervals of 2, 4, 6, 8 etc. . . . minutes may be analyzed for log space impact. The VDG interval duration and the number VDG intervals in a rotation set allows an analysis of rollback resolution (the time between snapshots) and log space consumption and management. The determination of log space versus how granular a CDP period and how far in the past is recovery possible may be assessed, as further discussed elsewhere herein.

FIGS. 8-11 are schematic illustrations showing representations of storage device(s) in connection with a data protection system using a log device according to an embodiment of the system described herein.

Figure 8:
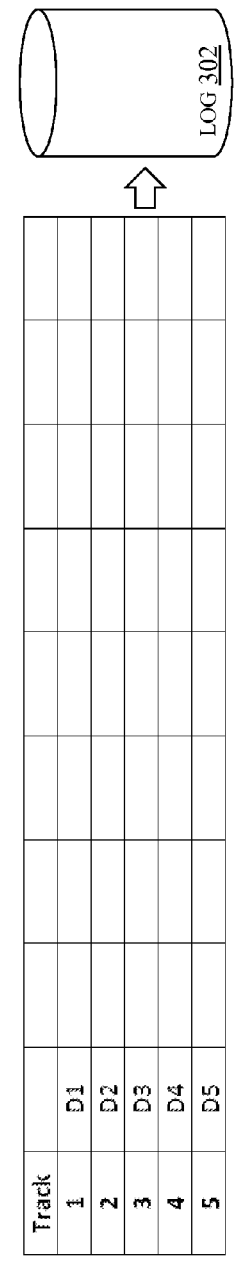
FIGS. 8-11 are schematic illustrations showing representations of devices in connection with a data protection system using a log device according to an embodiment of the system described herein.

FIG. 8 shows a representation 300 according to an embodiment of the data protection system described herein with a 5 track storage device for which each track 1-5 may contain source volume data D1-D5, respectively. A journal or log device 302 is shown, like that discussed elsewhere herein, that may be used in connection with data protection for purposes of roll back or other recovery processing. As discussed elsewhere herein, the log device 302 is not necessarily a single device and may include log capacity storage of a log pool comprised of one or more devices.

Figure 9:
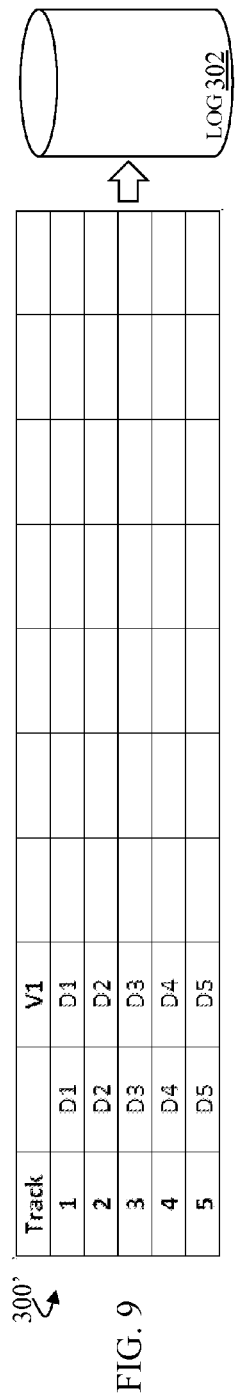

FIG. 9 shows a representation 300' according to an embodiment of the data protection system described herein showing a point-in-time image or version (V1) of data D3 made. There has been no write yet performed to the source data and thus there are no log entries in the log device 302. It is noted that the point-in-time version V1 of data D3 is illustrated in connection with Track 3 where the source volume of data D3 is stored. However, it is noted that the version V1 (and/or any other of the point-in-time versions discussed herein) may be stored in any appropriate storage location, including any suitable one or more of the devices discussed herein, and is not necessarily stored on Track 3 or any other of the tracks shown in connection with the 5 track storage device.

Figure 10:
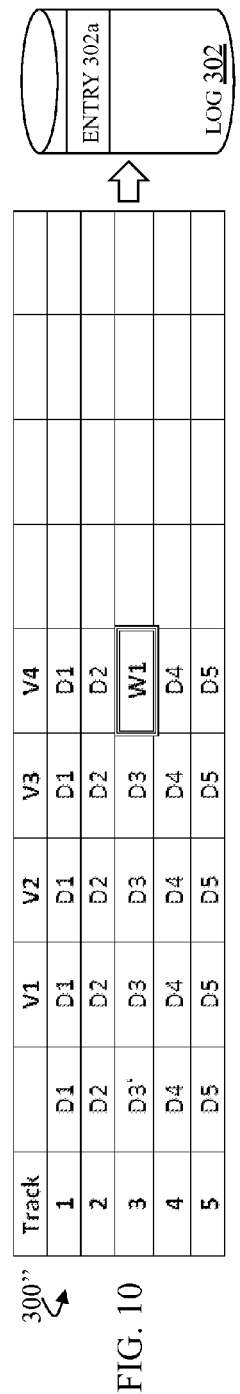

FIG. 10 shows a representation 300" according to an embodiment of the data protection system described herein showing additional point-in-time versions being made according to the system described herein. There are no writes to the devices over the intervals in which versions V2 and V3 are made, thereby versions V2 and V3 may be the same as version V1, and there are no required log entries for any versions V1-V3 in the log device 302. The figure shows that there are no writes to the device until the time of version V4 for a write (W1) to Track 3 (causing data D3' on the source volume) which causes a pre-write log entry 302a in the log device 302 to be logged according to the system described herein. The log entry 302a at the time of version V4 is a log entry corresponding to data D3.

Figure 11:
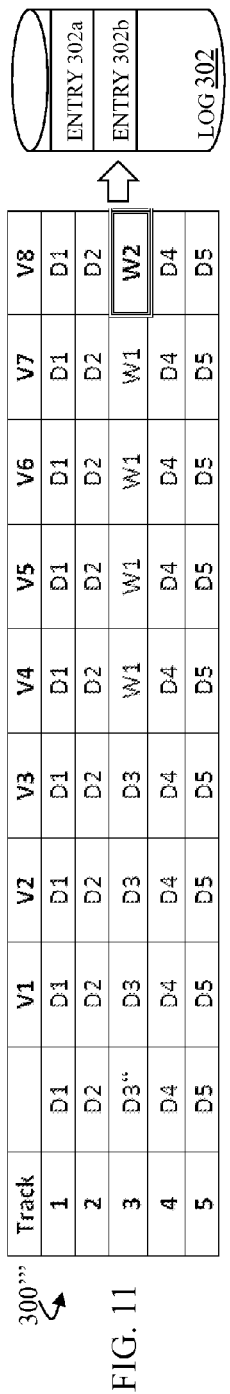

FIG. 11 shows a representation 300'" according to an embodiment of the data protection system described herein showing point-in-time version creation continuing until the time of version V8 when another write (W2) to Track 3 (resulting in data D3" stored on the source volume) creates a pre-write log entry 302b in the log device 302 corresponding to the write W1 (for data D3'). The log entry 302b at the time of version V8 is a log entry corresponding to the write W1. Versions V1, V2, and V3 may share the log entry 302a holding D3. Versions V4, V5, V6, and V7 may share the log entry 302b holding W1. V8 (reflecting write W2) does not need log capacity until a subsequent write occurs.

The system described herein may be used to recover log space based on desired criteria. For example, the criteria may be to recover 50% of the log space, and a query may be as to which point-in-time version could be terminated to accomplish this such that log space for corresponding log entries may be reclaimed/recovered. Control and management of queries, criteria and/or result output may be performed using control modules and user interfaces like that discussed elsewhere herein (see, e.g., FIG. 7). Log persistence is where some number of versions share the same pre-write image. This could be representative of data that is periodic and only updated infrequently. In this case, the number of point-in-time versions necessary to terminate could be large in order to reclaim log space. Log entries for more active same track writes may be shared by a smaller number of versions, thereby requiring fewer version terminations to reclaim log space and recover desired log capacity.

Figure 12:
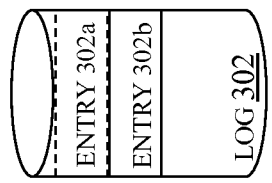
FIGS. 12-14 show scenario representations according to an embodiment of the system described herein for reclamation processing of a subject device to reclaim log capacity.
Figure 13:
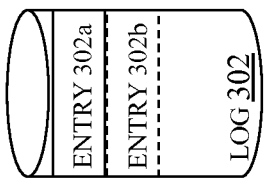
Figure 14:
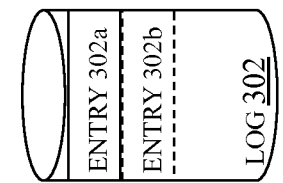

FIGS. 12-14 show scenario representations according to an embodiment of the system described herein for reclamation processing of a subject device to reclaim 50% of log capacity according to the scenario, discussed above, where Track 3 (storing data D3) is the subject of data writes. The example of reclaiming 50% log capacity as a criteria is discussed; however, it is noted the system described herein may be appropriately used in connection with reclaiming any desired amount or percentage of log capacity.

FIG. 12 is a schematic representation 301 showing that terminating point-in-time versions V1, V2, and V3 would allow the log entry 302a corresponding to data D3 to be reclaimed in the log device 302 (shown by dashed lines around log entry 302a). In this case, versions V4 through V8 persist with the W1 log pre-write image required to reconstitute V4 through V7. V8 has no pre-write image required yet.

FIG. 13 is a schematic representation 301' showing that, alternatively and/or additionally, terminating versions V4, V5, V6, and V7 allow the log entry 302b holding W1 to be reclaimed in the log device 302 (shown by dashed lines around log entry 302b). In this case, versions V1, V2, V3, and V8 persist with the log entry 302a for the D3 pre-write image required to reconstitute V1 through V3. V8 has no subsequent pre-write image required yet.

FIG. 14 is a schematic representation 301'' showing that, alternatively and/or additionally, terminating V5 through V8 allows the log entry 302b holding W1 to be reclaimed in the log device 302 (shown by dashed lines around log entry 302b). In this case, versions V1, V2, V3 share the log entry 302a for the D3 pre-write image to reconstitute V1 through V3. V4 has no subsequent pre-write image required.

FIGS. 15 and 16 show scenario representations according to an embodiment of the system described herein for reclamation of a subject device when multiple tracks are involved to reclaim 50% of the log capacity.

FIG. 15 is a schematic representation 400 according to an embodiment of the system described herein showing an ending state of a scenario in which a write W1 was made to D3 (now data D3' on source volume) on Track 3 at a time of the version V4 and a write W2 was made to data D2 (now data D2' on source volume) on Track 2 at a time of version V8. Accordingly, in log device 402, log entry 402a corresponds to the D3 pre-write image created at the time of version V4 and log entry 402b corresponds to the D2 pre-write image created at the time of version V8.

FIG. 16 is a schematic representation 400' according to an embodiment of the system described herein showing reclaiming of 50% log capacity based on the scenario of FIG. 15. In this case, the D3 pre-write image is required by versions V1 through V3, and the D2 pre-write image is required by versions V1 through V7. Accordingly, only terminating V1 through V3 reclaims 50% of the log capacity, namely, the D3 pre-write image log space of entry 402a in the log device 402 (shown by dashed lines around the entry 402a). The D2 pre-write image of log entry 402b is the most persistent being shared by all versions except V8. The example of reclaiming 50% log capacity as a criteria has been discussed; however, it is noted the system described herein may be appropriately used in connection with reclaiming any desired amount or percentage of log capacity.

According to the system described herein, using data collected for the first writes to tracks in a volume group during a planning interval allows estimating the potential maximum capacity for the log pool that is needed for various frequency of version creation.

The system described herein provides that information on pre-write image log persistence or the number of consecutive versions sharing a log entry may also be analyzed. This provides information concerning how removing versions from the VDG effects log pool capacity reclamation. This information may be used for understanding the number of versions that may be removed to achieve a target log pool capacity. Accordingly, oldest versions and versions other than the oldest in a rotation set may be considered for removal.

Additionally, rotation of a set number of versions (the VDG) may be analyzed. First writes in an interval give the net add to log pool capacity consumption. In this case, termination of the oldest version member in the rotation set may give the potential maximum reduction in log consumption. The actual reduction is dependent on the number of versions sharing a particular track pre-write image. When a target log pool size is desired the number of versions to terminate can be analyzed.

In a VDG rotation cycle the oldest member version would be removed prior to adding a new version. The log capacity may need to be the maximum expected concurrent log pre-write image capacity plus a margin for safety. It is noted that demand reclaim from oldest to newest may require the least active analysis. For example, using differential data write monitoring, such as SDDF write monitoring, for each version allows for a log capacity by version metric. However, reclaiming pre-write image log capacity may involve termination of some number of versions to achieve a desired log capacity reduction. As seen, for example, in the scenarios discussed herein, three versions (V1, V2, and V3) may need to be terminated before the single pre-write image log capacity associated with the data D3 can be reclaimed. A worst case would be where many versions with low or no writes are created and during the most recent version having most or all tracks written. An example might be where a DB2 table create and format occurs in generation 100 and the prior 99 versions share the pre-write images of the involved tracks. The 99 prior versions would need to be terminated before the pre-write image log capacity could be reclaimed.

Exempting particular versions from rotation termination makes this problem even more evident. While capacity consuming (equal to the source capacity of the VDG) creating a full copy target and unlinking it after being fully populated would be an operational tradeoff to diminishing impact on log reclamation by holding one or more versions exempt from termination.

In another embodiment, the system described herein may be used in connection with a continuous review of which versions contribute the least to log capacity but share the most images with other versions. Referring, for example, back to FIG. 15, in this case it is noted that versions V1, V2, V5, V6 and V7 could all be terminated without losing any unique version of the source volume data. V3, V4, and V8 are unique versions for this source volume.

FIG. 17 is a schematic representation 500 according to the embodiment of the system described herein shown in FIG. 15 in which versions V1, V2, V5, V6 and V7 have been terminated, but all unique first write pre-write images in each version interval are preserved. Tracks with data D1, D2, D3, D4, D5, W1, and W2 and the versions that consistently relate them in time are available to create useable target sets based on use of the log entries 502a, 502b of the log device 502. This can be determined by tracking the first write differential (SDDF) data for each version interval.

According further to the system described herein, it is noted that with a VDG creating short interval snapshot members it is possible that some VDG members will have no first write activity and can be terminated after the next interval VDG is activated. If there is first write activity within the VDG there may be subgroupings in that VDG interval that do not have any first writes for the interval. If a subgroup is identified by the user as logically-related volumes (a particular application, for example) only the snapshots of the volumes in that subgroup may be terminated if there are no first write to that subgroup. This could also apply to single volumes within the VDG that do not have interdependent data with other volumes in the VDG. These determinations may be specified by the user of the VDG control mechanism.

Figure 18:
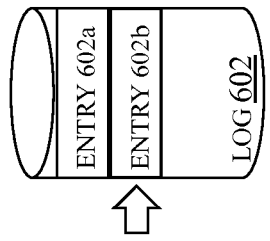
FIGS. 18 and 19 show scenario representations according to an embodiment of the system described herein for reclamation of a subject device when multiple volumes are involved to reclaim log capacity.
Figure 19:
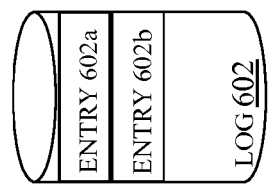

Accordingly, FIGS. 18 and 19 show scenario representations according to an embodiment of the system described herein for reclamation of a subject device when multiple volumes are involved to reclaim log capacity. Specifically, in an embodiment, the system described herein may also be used in connection with application to volumes instead of tracks and may provide for continuously collapsing volume log images.

FIG. 18 is a schematic representation 600 according to an embodiment of the system described herein showing an ending state of a scenario for storage of 5 volumes (Volumes 1-5) and for which 8 point-in-time versions (V1-V8) thereof have been made. The representation 600 shows a state in which a write W1 was made to D3 (now data D3') of Volume 3 at a time of the version V4 and a write W2 was made to data D2 (now data D2') of Volume 2 at a time of version V8. Accordingly, in log device 602, log entry 602a corresponds to the D3 pre-write image created at the time of version V4 and log entry 602b corresponds to the D2 pre-write image created at the time of version V8.

FIG. 19 is a schematic representation 600' according to the embodiment of the system described herein shown in FIG. 18 in which versions V1, V2, V5, V6 and V7 have been terminated, but all unique first write pre-write images of the volumes in each version interval are preserved. The capability for reconstruction of a VDG point-in-time when constituent member volumes may have their snapshot terminated is illustrated in the figure. Point in time V1, V2 and V3 can independently be reconstructed using the original data images D1 through D5 of the Volumes 1-5 and the log entries 602a, 602b of the log device 602. V5, V6, and V7 only need the W1 first write from V4. Reconstruction of version V8 needs the Volume 3 version V4 for W1 and itself for the Volume 2 W2 first write pre-write image. This figure depicts the minimum (3 versions) needed to reconstruct 8 distinct points in time for the illustrated volumes. A first write to any single track on a volume requires the volume snapshot to be preserved.

Figure 20:
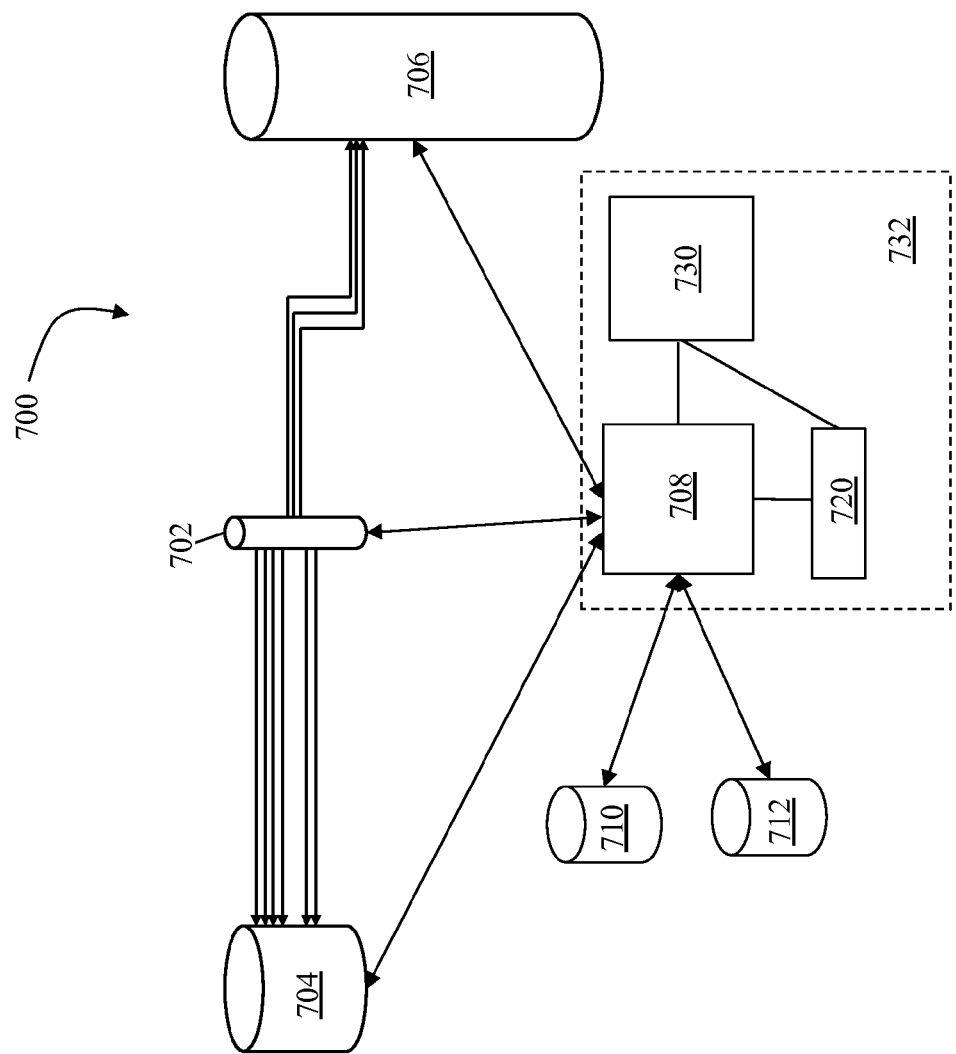
FIG. 20 is a schematic diagram showing a system implementing iCDP according to an embodiment of the system described herein.

FIG. 20 is a schematic diagram showing a system 700 implementing iCDP according to an embodiment of the system described herein. A point-in-time image device 702 may facilitate continuous or near continuous backup of data using snapshots, and/or other appropriate point-in-time images, as further discussed in detail elsewhere herein. The point-in-time image device 702 may contain pointers to a standard logical device 704 for a plurality of tracks storing data. The point-in-time image device 702 may also contains pointers to a log device 706 logging data changes to corresponding tracks, as further discussed in connection with the scenarios discussed elsewhere herein.

The system 700 may also include a I/O module 708 that handles input and output processing in connection with receiving and responding to requests and criteria concerning the providing of efficient data protection operations in accordance with the system described herein. The I/O module 708 may be provided with information from a cycle counter 710 and/or a timer 712, among other possible information sources, that may be used in connection with storage of data among a plurality of storage devices (i.e., for a consistency group and/or VDG). The I/O module 708 may further include, and/or be coupled to, an interface 720 that enables interaction with users and/or hosts in connection with operation of the system described herein.

A point-in-time data analytic analyzer 730 is shown that may be used to automatically/programmatically determine which point-in-image to roll back for one or more data recovery operations according to an embodiment of the system described herein. For example, information, such as host meta structures, may be available to the analyzer 730 to facilitate the scanning and/or identification of logical data corruption or errors. Such host meta structures may include structures of IBM's System z environment, as discussed elsewhere herein, such as logical structures of a volume table of contents (VTOC), VTOC index (VTOCIX), virtual storage access method (VSAM) volume data sets (VVDS), catalogs and/or related structures that are logical in nature and which may be used in connection with the scanning for logical failures rather than physical failures, and may indicate what a user or customer may be looking for in a roll back or recovery scenario. For example, in an IBM mainframe storage architecture, a VTOC provides a data structure that enables the locating of the data sets that reside on a particular disk volume, and the z/OS may use a catalog and the VTOC on each storage device to manage the storage and placement of data sets. In an embodiment, the system described herein may then use these structures to efficiently provide desired roll-back and data protection operations according to the features discussed herein.

It is noted that the I/O module 708, interface 720 and/or analyzer 730 may be separate components functioning like that as discussed elsewhere herein and/or may be part of one control unit 732, which embodiment is shown schematically by dashed lines. Accordingly, the components of the control unit 732 may be used separately and/or collectively for operation of the iCDP system described herein in connection with the creation, maintenance, identification and termination of point-in-time image versions to respond to requests and criteria, like that discussed elsewhere herein, including criteria concerning identification of necessary point-in-time versions to fulfil desired roll back scenarios and criteria involving the efficient use of log capacity to maintain the desired data protection capability.

For operation and management functions, the system described herein may provide for components like that discussed herein that may be used to create a VDG volume group and support sets of selection options, such as Group Name Services (GNS) in connection with data protection operations. The system described herein may further be used to define version interval frequencies and to define the maximum number of member versions in a VDG. Options for when the maximum is reached may include rotation when the oldest version is terminated before the next version is created, stopping with notification, and terminating n number of oldest versions before proceeding, etc. The system may further define target volume set(s) and validate that the type, geometry, and number match the related VDG.

The system described herein provides for automation to manage one or more VDGs. Point-in-time versions may be created based on defined interval criteria on a continuing cycle. VDG version rotation may be provided to remove the versions prior to next VDG version creation. The number of VDG version terminations necessary to achieve a log pool capacity target may be tracked. Host accessible images of selected VDG versions may be created and metadata of the target set may be managed to allow successful host access. Metadata management may include: validation of type and number of target volumes; online/offline volume verification; structure checking of a target volume set; optional volume conditioning; catalog management and dataset renaming; and providing alternate logical partition (LPAR) access.

A target volume set may be created from a selected VDG version and a user may be provided with selected copy and access options. A selected target volume set may be removed and which may include validating a target volume set system status, providing secure data erase of target volume set volumes and/or returning target volume sets to available pools. Specific versions may also be removed and the system supports explicit version termination, as discussed in detail elsewhere herein.

The system described herein may provide for monitoring and reporting functions using components like that discussed elsewhere herein. The status of created versions in a VDG may be monitored. Log pool capacity may be monitored and the system may provide for alerts and actions for log pool capacity targets, log capacity reclaim reports may be generated when versions are removed (i.e. during cycle rotation), and active target volume sets needed to be removed to allow the removal of a version may be identified. The status of an active target volume set, and related VDG versions may be monitored. The status of target volumes sets created outside (unmanaged) of the VDG environment may be monitored. Versions needed to be removed to reclaim some target amount of log pool capacity may be identified, as discussed in detail elsewhere herein.

Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage devices having components as described herein, alone or in combination with other devices, provide an appropriate platform that executes any of the steps described herein. The system may operate with any snapshot mechanism not inconsistent therewith and further with any appropriate point-in-time image mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for providing data protection in a storage system, comprising:
    storing a plurality of point-in-time versions of data of a plurality of source volumes in the storage system, wherein the plurality of source volumes form a version data group which together offer to at least one application a consistent image of data for the application;
    in connection with a write by the at least one application to the data stored in any of the source volumes of the version data group, storing at least one log entry in a log device corresponding to a particular point-in-time version of the data prior to the write for each volume of the version data group to which a write was performed, wherein subsequent point-in-time versions after the particular point-in-time version share the at least one log entry until a subsequent write to the data stored in the particular one of the source volumes is performed, wherein the point-in-time versions and the at least one log entry enable the storage system to revert from a current data state to one or more point-in-time states defined by the point-in-time versions; and
    terminating a particular point-in-time version of the source volumes of the version data group in which no writes to any volumes in the version data group have been performed, wherein the particular point-in-time version of the source volumes is selected based on an amount of reclaimed space in the log device resulting from termination of the particular point-in-time version, the log device being separate from the source volumes.

2. The method according to claim 1, wherein terminating the at least one point-in-time version of the source volumes reclaims log space on the log device.

3. The method according to claim 1, wherein terminating the at least one point-in-time version of the source volumes enables reversion to any desired prior storage state.

4. The method according to claim 3, wherein terminating the at least one point-in-time version includes identification of the point-in-time versions to enable reversion to any desired prior storage state in a way that minimizes use of log space on the log device.

5. The method according to claim 1, further comprising:
providing an interface device that receives a query concerning the termination and outputs results of the termination of the at least one point-in-time version.

6. The method according to claim 1, further comprising:
controlling an interval between times when each of the plurality of point-in-time versions is stored.

7. A non-transitory computer readable medium storing software for providing data protection in a storage system, the software comprising:
executable code that stores a plurality of point-in-time versions of data of a plurality of source volumes in the storage system, wherein the plurality of source volumes form a version data group which together offer to at least one application a consistent image of data for the application;
executable code that, in connection with a write by the at least one application to the data stored in any of the source volumes of the version data group, stores at least one log entry in a log device corresponding to a particular point-in-time version of the data prior to the write for each volume of the version data group to which a write was performed, wherein subsequent point-in-time versions after the particular point-in-time version share the at least one log entry until a subsequent write to the data stored in the particular one of the source volumes is performed, wherein the point-in-time versions and the at least one log entry enable the storage system to revert from a current data state to one or more point-in-time states defined by the point-in-time versions; and
executable code that terminates a particular point-in-time version of the source volumes of the version data group in which no writes to any volumes in the version data group have been performed, wherein the particular point-in-time version of the source volumes is selected based on an amount of reclaimed space in the log device resulting from termination of the particular point-in-time version, the log device being separate from the source volumes.

8. The non-transitory computer readable medium according to claim 7, wherein terminating the at least one point-in-time version of the source volumes reclaims log space on the log device.

9. The non-transitory computer readable medium according to claim 7, wherein terminating the at least one point-in-time version of the source volumes enables reversion to any desired prior storage state.

10. The non-transitory computer readable medium according to claim 9, wherein the executable code that terminates the at least one point-in-time version includes executable code that identifies the point-in-time versions to enable reversion to any desired prior storage state in a way that minimizes use of log space on the log device.

11. The non-transitory computer readable medium according to claim 7, further comprising:
executable code that provides an interface that receives a query concerning the termination and outputs results of the termination of the at least one point-in-time version.

12. The non-transitory computer readable medium according to claim 7, further comprising:
executable code that controls the interval between times when each of the plurality of point-in-time versions is stored.

13. A data protection system, comprising:
at least one storage device that stores data on a plurality of source volumes;
at least one log device that stores log entries corresponding to the data stored on the plurality of source volumes;
a non-transitory computer readable medium storing software that, when executed by at least one processor, provides data protection, the software including:
executable code that stores a plurality of point-in-time versions of data of a plurality of source volumes in the storage device, wherein the plurality of source volumes form a version data group which together offer to at least one application a consistent image of data for the application;
executable code that, in connection with a write by the at least one application to the data stored in any of the source volumes of the version data group, stores at least one log entry in the log device corresponding to a particular point-in-time version of the data prior to the write for each volume of the version data group to which a write was performed, wherein subsequent point-in-time versions after the particular point-in-time version share the at least one log entry until a subsequent write to the data stored in the particular one of the source volumes is performed, wherein the point-in-time versions and the at least one log entry enable the storage system to revert from a current data state to one or more point-in-time states defined by the point-in-time versions; and
executable code that terminates a particular point-in-time version of the source volumes of the version data group in which no writes to any volumes in the version data group have been performed, wherein the particular point-in-time version of the source volumes is selected based on an amount of reclaimed space in the log device resulting from termination of the particular point-in-time version, the log device being separate from the source volumes.

14. The data protection system according to claim 13, wherein terminating the at least one point-in-time version of the source volumes reclaims log space on the log device.

15. The data protection system according to claim 13, wherein terminating the at least one point-in-time version of the source volumes enables reversion to any desired prior storage state.

16. The data protection system according to claim 15, wherein the executable code that terminates the at least one point-in-time version includes executable code that identifies the point-in-time versions to enable reversion to any desired prior storage state in a way that minimizes use of log space on the log device.

17. The data protection system according to claim 13, further comprising:
an interface that receives a query concerning the termination and outputs results of the termination of the at least one point-in-time version.

18. The data protection system according to claim 13, wherein the software further comprises:

executable code that controls the interval between times when each of the plurality of point-in-time versions is stored.

* * * * *